May 25, 1954   C. A. POSSON   2,679,139
VARIABLE SPEED ROTARY PUMP AND MOTOR TRANSMISSION
Filed Oct. 12, 1951   6 Sheets-Sheet 1

INVENTOR.
Chester A. Posson
BY
Harvey M. Gillespie
Atty.

May 25, 1954 C. A. POSSON 2,679,139
VARIABLE SPEED ROTARY PUMP AND MOTOR TRANSMISSION
Filed Oct. 12, 1951 6 Sheets-Sheet 2

Fig. 2.

INVENTOR.
Chester A. Posson
BY
Harvey M. Gillespie
Atty.

May 25, 1954 C. A. POSSON 2,679,139
VARIABLE SPEED ROTARY PUMP AND MOTOR TRANSMISSION
Filed Oct. 12, 1951 6 Sheets-Sheet 3

INVENTOR.
Chester A. Posson
BY
Harvey M. Gillespie
Atty.

May 25, 1954 C. A. POSSON 2,679,139
VARIABLE SPEED ROTARY PUMP AND MOTOR TRANSMISSION
Filed Oct. 12, 1951 6 Sheets-Sheet 4

INVENTOR.
Chester A. Posson
BY
Harvey M. Gillespie
Atty.

May 25, 1954          C. A. POSSON          2,679,139
VARIABLE SPEED ROTARY PUMP AND MOTOR TRANSMISSION
Filed Oct. 12, 1951          6 Sheets-Sheet 5

Fig. 7.

INVENTOR.
Chester A. Posson
BY
Harvey M. Gillespie
Atty.

May 25, 1954  C. A. POSSON  2,679,139
VARIABLE SPEED ROTARY PUMP AND MOTOR TRANSMISSION
Filed Oct. 12, 1951  6 Sheets-Sheet 6

INVENTOR.
Chester A. Posson
BY
Harvey M. Gillespie
Atty.

Patented May 25, 1954

2,679,139

UNITED STATES PATENT OFFICE 2,679,139

VARIABLE SPEED ROTARY PUMP AND
MOTOR TRANSMISSION

Chester A. Posson, Chicago, Ill.

Application October 12, 1951, Serial No. 251,054

10 Claims. (Cl. 60—53)

The present invention relates to variable speed transmissions and more particularly to a novel type of variable speed ratio-transmitting device in a form which depends for its operation upon hydraulic principles, yet which differs widely from conventional variable speed hydraulic transmissions.

The invention further relates to a mechanism of the above character in which the effective speed ratio attained between the driving member and the driven member of the transmission, at any given instant, is a function of the load or resistance applied to the driven member and of the power applied to the driving member.

The improved transmission comprising the present invention will be found useful as an automotive transmission where the speed ratio between the engine driving shaft or crank shaft and the input shaft of the differential gearing leading to the driving wheels of the vehicle must be varied to accommodate changing load conditions or to accommodate the preferences or requirements of the operator of the vehicle. The transmission is, however, by no means limited to such use and the same may, with or without modification, be employed for driving all manner of land vehicles such as tractors or other farm implements, navigable craft whether water or airborne, for operating machine tools, and, in general wherever the efficient transmission of power from a rotary driving member to a rotary driven member is desired. For illustrative purposes, the invention has been shown herein as being designed for use in connection with an automotive vehicle and in the following description reference to conditions that arise in connection with the operation of such a vehicle has been made since these conditions are typical of the use to which the present transmission may be put. It will be understood however that when put to other uses, the present transmission will function in a similar manner and effectively serve the purposes for which it is intended.

In carrying out the principles of the present invention, briefly, the improved variable speed transmission contemplates the provision of a relatively small compact arrangement of instrumentalities including a pump section and a motor section hydraulically connected to each other in such a manner that the former section will serve to drive the latter section at varying speed ratios. The pump section is adapted to be connected to a rotary driving member or shaft and includes a rotary cylinder block having a series of cylinders therein in which there are disposed pistons that effect a pumping action on the hydraulic fluid or oil and which derive their reciprocal motion under the influence of an adjustable control cam which is non-rotary but which may be adjusted to vary the stroke, and consequently the displacement and pumping action of the pistons. The rotary pump section is, by adjustment of the control cam, capable of effecting alternate pressure and suction strokes wherein the oil or other pressure fluid is discharged from the rotating cylinders during another portion of each rotation thereof. Means are provided whereby the discharged fluid is conducted to one of two fluid reservoirs or wells and the withdrawn fluid is taken from the other of the two fluid reservoirs or wells.

The fluid reservoirs are conveniently located between the pump section and the motor section. The latter section includes a rotary cylinder block which, like the cylinder block of the pump section, is also connected to the driving member and is provided with a series of cylinders having reciprocal pistons mounted therein. The pistons of the motor section are operatively connected in driving relationship to a driven member or shaft which constitutes the output member of the transmission and the connection is made through the medium of a common rotary driven cam secured to the driven member or shaft and upon which the various pistons are capable of operating to impart rotary motion to the cam and consequently to the driven member. The driven cam of the motor section, unlike the driving cam of the pump section, is fixed relative to the driven shaft and is nonadjustable.

Disposed between the two reservoirs or wells and the pump and motor sections is a valve mechanism which serves to control the flow of fluid to and from the two transmission sections, namely the motor and pump sections.

The arrangement of parts briefly outlined above is such that, figuratively speaking, a solid non-compressible fluid wall is established between the rotating pistons of the driving pump section and the rotating pistons of the driven motor section. The displacement of the various pistons of the pump section may be varied according to the particular adjustment of the non-rotary control cam and the recriprocal motion of the pump pistons is imparted directly to the pistons of the motor section through the medium of the non-compressible fluid wall so that the latter pistons will operate upon the driven cam associated with the driven shaft to translate rotary motion of the driving shaft into rotary motion of the driven shaft.

The maximum displacement of the pump pistons is greater, and preferably twice as great, as the maximum displacement of the pistons of the motor section and, as a consequence the control cam may be adjusted so that the delivery of fluid to the motor section from the pump section is greater than, equal to, or less than the amount of fluid the motor section is capable of receiving. Where the pump section delivers to the motor section the exact amount of fluid of which the latter is capable of receiving, and the pistons of the former section discharge to the same reservoir from which the pistons of the latter section withdraw, the motor pistons follow the contour of the driven cam, regardless of the speed of the driving shaft and no motion is imparted to the cam or to the driven shaft. Where, due to the setting of the control cam, the pump section delivers to the motor section less fluid than it is capable of receiving, and the same condition of intake and discharge of the two sets of pistons obtains, the pistons of the motor section will be unable to perform their full stroke due to decreased pressure in the so-called solid wall of fluid existing between the two sets of pistons. As a consequence the pistons will operate upon the driven cam and rotate the same a distance commensurate with the difference between the partial and full strokes of the pistons. Where the control cam is adjusted so that the pump pistons neither supply fluid to nor withdraw fluid from the reservoirs, the pistons of the motor section are obliged to remain fixed insofar as their reciprocation is concerned and, as a consequence the driven cam will operate in the manner of an escapement and rotate in the path provided for it by the cooperating pistons of the motor section. In such an instance the driven cam will rotate at a rate of speed so as to establish a one-to-one or direct drive ratio between the driving and driven shafts.

Where the control cam is adjusted so that the pump pistons and the motor pistons are so related that the pump pistons discharge a sufficient amount of fluid that the motor pistons are unable to perform their discharge or return stroke against the body of fluid so discharged, a condition obtains wherein the pistons act upon the driven cam in such a manner as to cause the same to overrun the speed of rotation of the driven shaft, thus establishing the equivalent of an overdrive as commonly known in connection with conventional transmissions.

When the control cam is so adjusted that the pump pistons deliver a greater amount of fluid than the motor pistons can assimilate or displace if the driven shaft be maintained stationary, the motor pistons will operate upon the driven cam to cause the latter to rotate in a direction counter to the direction of rotation of the driving shaft. Thus, a reverse drive is established through the transmission.

The above brief description of the improved hydraulic variable speed transmission has been based upon a discussion of the displacement of fluid in one direction by the pistons of the pump section and such a description is sufficient for the present to enable clear understanding of the objects and advantages of the invention to be set forth. Actually however there is a two-way displacement of fluid between the pump and motor sections involving a body of fluid at relatively high internal pressure and a body of fluid at relatively low pressure operating between the pistons of both sections to drive the motor section from the pump section at the desired speed ratio.

The provision of a variable speed transmission of the character briefly outlined above being the principal object of the invention, another and more general object is to provide a hydraulic variable speed transmission including a series of movable impeller members which are operatively connected to and derive their motion from a driving shaft or member, and a series of movable driven members, together with means for establishing a hydraulic connection between the two series of members which is positive in its action and serves to transmit motion from the driving series of movable members to the driven series of members by virtue of the incompressibility of the hydraulic fluid existing therebetween.

Another object of the invention is to provide such a transmission in which the relative displacements between the driving series of members and the driven series of members may be varied at will to thereby effect varying speed ratio drives through the transmission.

A further object is to provide a fluid variable speed transmission which is capable of establishing a one-to-one or direct drive between the driving member and the driven member and which, when so adjusted, will effect revolution of the various moving parts thereof in unison about a common axis without relative movement therebetween, thus minimizing wear on the various parts involved.

A still further object is to provide a transmission of the character briefly outlined above in which the speed ratio delivery will remain constant for any selected adjustment thereof regardless of the speed of rotation of the driving member, the power applied thereby or of the load upon the driven member.

Yet another object of the invention is to provide a fluid variable transmission of this character which is capable of an unlimited number of forward speed drive ratios and of an unlimited number of reverse speed drive ratios within certain predetermined limits.

The provision of a variable speed transmission which is relatively small and compact, considering its power range; one which is comprised of a minimum number of moving parts and which consequently is unlikely to get out of order; one which is capable of readily being assembled or disassembled for purposes of inspection or repair; one which develops very little heat when in operation; one which requires the use of a minimum amount of fluid, and one which is otherwise well adapted to perform the services required of it, are further desirable features that have been borne in mind in the production and development of the present invention.

Other objects and advantages of the invention, not at this time enumerated, will become more readily apparent as the nature of the invention is better understood.

In the accompanying drawings forming a part of this specification, one embodiment of the invention has been shown.

In these drawings.

In all of the above described views, similar characters of reference are employed to designate similar parts throughout.

Figure 1:
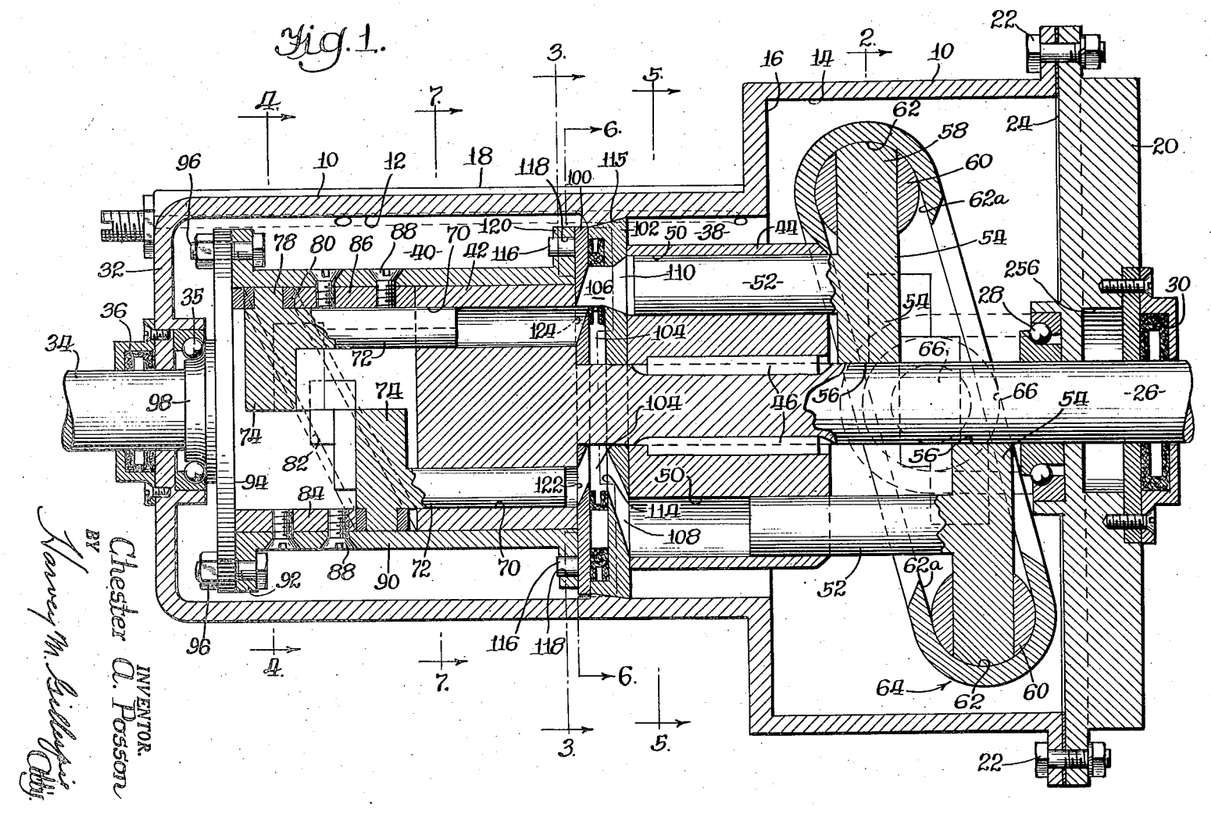
Figure 1 is a sectional view taken substantially centrally and longitudinally through a variable speed transmission constructed in accordance with the principles of the present invention.
Figure 7:
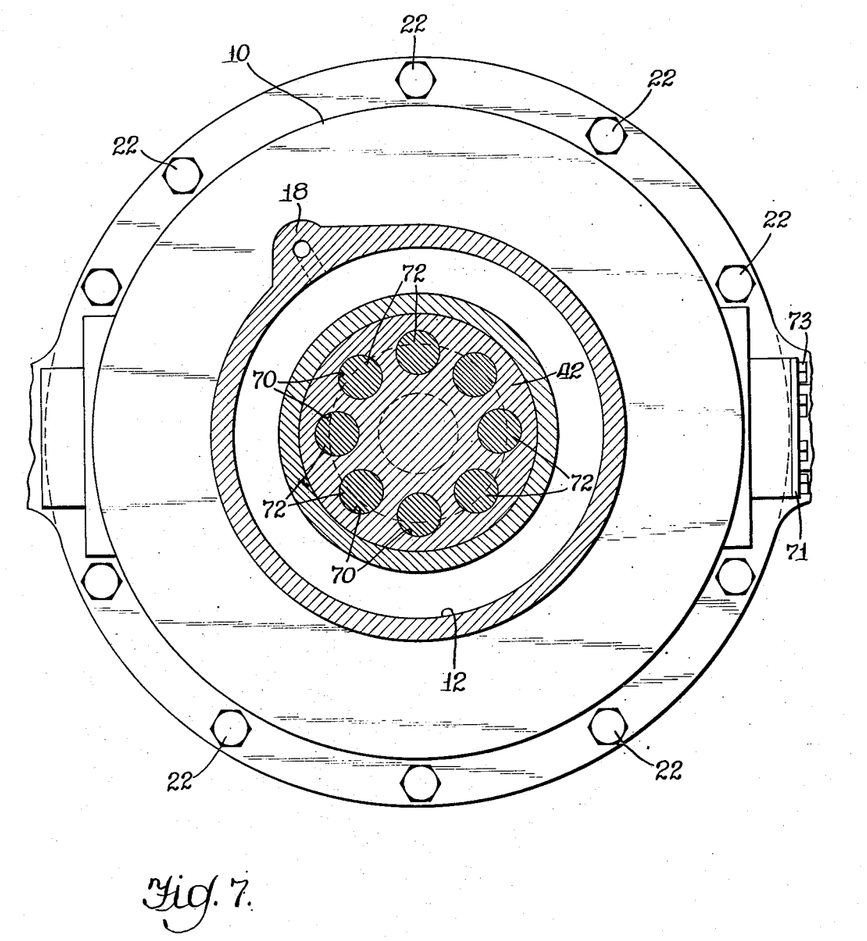
Fig. 7 is a sectional view taken substantially along the line 7—7 of Fig. 1.

Referring now to the drawings in detail and in particular to Fig. 1, the improved transmission involves in its general organization a generally cylindrical outer casing or shell 10 of stepped configuration and providing a cylindrical bore 12 of relatively small diameter and an enlarged counterbore 14. The two bores 12 and 14 provide an inwardly extending shoulder 16 therebetween and the medial regions of the casing are provided with a thickened portion 18 (see also Figs. 2 and 7) which extends lengthwise of the casing.

The large or right-hand end of the casing 10 as viewed in Fig. 1 is provided with a closure plate 20 which may be bolted as at 22 or otherwise secured to the open end of the casing 10, a suitable sealing gasket 24 being provided between the two parts. The closure plate 20 provides support for the transmission drive shaft 26 which extends through the plate 20 and axially into the interior of the casing 10. Suitable antifriction bearings 28 carried by the plate 20 serve to rotatably support the shaft 26, and a sealing gland 30 prevents egress of hydraulic fluid from the casing 10 around the shaft 26.

The small or left-hand end of the casing 10, as viewed in Fig. 1, is provided with an inturned flange 32 which provides a support for the driven shaft 34 of the transmission. Antifriction bearings 35 and a packing gland 36 are provided for the shaft 34 and are suitably carried by the inturned flange 32.

The casing 10 is adapted to enclose substantially all of the operative working parts of the transmission by means of which rotary motion of the driving shaft 26 is translated into rotary motion of the driven shaft 34. Generally speaking, the transmission instrumentalities include a pump section designated in its entirety at 38 and a motor section designated in its entirety at 40. The former or pump section derives its motion from the driving shaft 26 and transmits motion to the latter or motor section which, in turn, translates its motion to the driven shaft 34 in a manner that will become clear presently. The medium by means of which motion of the pump instrumentalities 38 is transmitted to the motor instrumentalities 40 is the hydraulic fluid within the casing 10 and an incompressible body or wall of such fluid is maintained between the relatively moving parts of the two sections so that a positive drive between the parts with no lost motion will take place when the transmission is in operation at any selected speed ratio drive.

Still referring to Fig. 1, the driving shaft 26 projects into the casing 10 axially a substantial distance and carries at its extreme inner end a cylinder block 42 associated with the motor section 40, and also carries in its medial regions a second cylinder block 44 associated with the pump section 38. The cylinder blocks 42 and 44 are both fixedly secured to the driving shaft 26, the latter block being keyed thereto as at 46. As a consequence both of the blocks 42 and 44 rotate in unison with the shaft 26 and at the same rate of speed as the latter.

The cylinder block 44 is provided with a series of circumferentially spaced radially offset cylinders or bores 50 therein which extend in parallelism with one another and with the axis of the driving shaft 26. The cylinders 50 are opened and each cylinder has mounted for reciprocation therein a piston 52. The right-hand ends of the pistons 52, as viewed in Fig. 1, are each provided with head portions 54 of tapered design (see also Fig. 2) the opposite side faces of which slidably engage adjacent head portions of other pistons 52. The inner ends 56 of said head portions 54 bear against and slide upon the shaft 26 and at their outer ends 58 carry cam followers 60 of generally spherical design which are adapted to ride in a circular guideway or internal cam groove 62 provided in a ring-like cam member 64 mounted within the enlarged counterbore 14 of the casing 10.

The cam ring or member 64 is non-rotatable but it is capable of tilting movement about an axis transverse to the axis of rotation of the driving shaft 26. Toward this end it is provided with oppositely extending trunnions 66 at diametrically opposed regions which are journalled in the wall of the casing 10. The cam ring or member 64 is thus tiltable about the axis of the trunnions 66 from the extreme inclined position in which it is diagrammatically illustrated in Fig. 11 to the extreme inclined position in which it is illustrated in Fig. 10 for the purpose of establshing varying speed ratio drives through the transmission, all in a manner that will be made clear presently. When the said cam ring 64 is in either of its extreme positions the cam followers 60 will contact the transversely curved portions of the groove 62, but will bear against the flat side walls 62ª of the groove 62 when the cam ring is adjusted toward a perpendicular position, for example the position shown in Fig. 9.

In order to provide a means whereby the angular setting of the cam ring 64 may be adjusted, one of the trunnions 66 (Fig. 2) is provided with a square socket 67 formed therein designed for reception of a mating lug 68 formed on an operating lever 69 positioned exteriorly of the transmission casing 10 and secured to the casing for pivoted movement relative thereto by means of a slotted retaining plate 71 and fastening screws 73. The free end of the lever 69 may be operatively connected through a suitable mechanical linkage to a control lever or the like (not shown) which, when the transmission is employed in connection with an automotive vehicle, is conveniently available to the operator of the vehicle.

Figure 2:
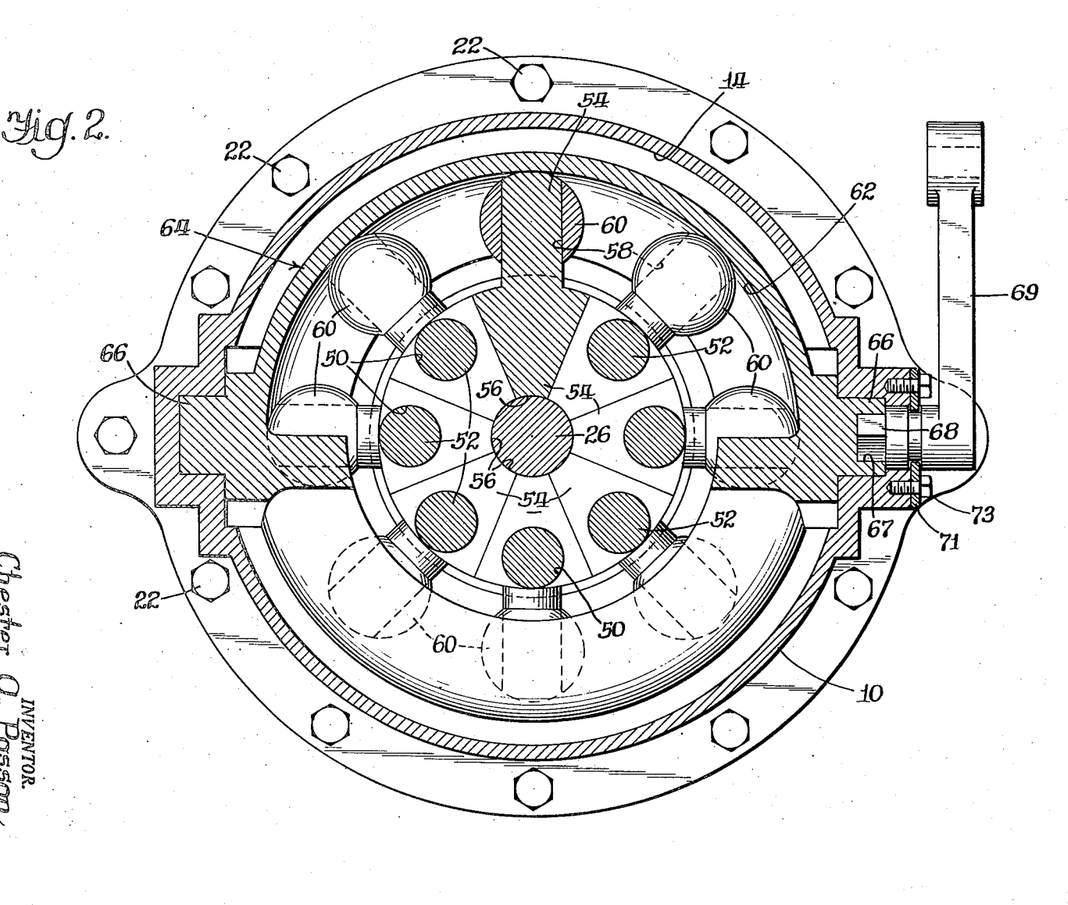
Fig. 2 is a sectional view taken substantially along the line 2—2 of Fig. 1.
Figure 8:
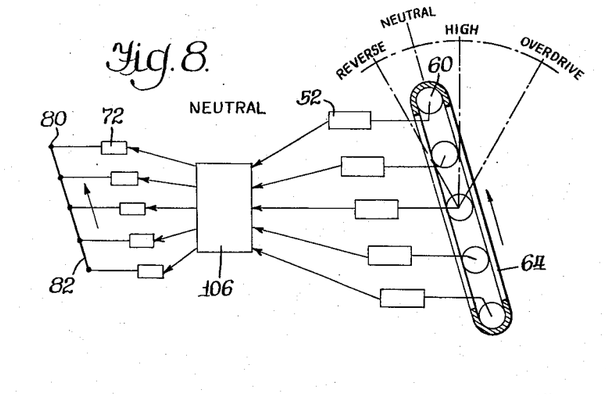
Figs. 8, 9, 10, and 11 are diagrammatic views, entirely schematic in their representation, illustrating certain hydraulic principles involved in connection with the transmission when the latter is in its neutral condition, in direct drive at a one-to-one drive ratio, in overdrive at a maximum of two-to-one drive ratio, and in reverse drive at a maximum of one-to-one drive ratio respectively.

If it is assumed that the driving shaft 26 rotates in a clockwise direction as viewed in Fig. 2, it will be seen that when the cam ring 64 is inclined in the general direction shown in Figs. 1, 8 and 11 on one side of its vertical position, upon rotation of the shaft 26 and cylinder block 44 the pistons 52 at the far side of the casing 10 as viewed in Fig. 1 or at the left side of the casing as viewed in Fig. 2, will be moving to the right as seen in Fig. 1 to draw fluid into the left-hand end of the various cylinders 50. Such movement of the pistons 52 is referred to herein as the suction or intake stroke. Conversely, the pistons at the near side of the casing 10 in Fig. 1, or at the right side of the casing in Fig. 2, will be moving to the left as seen in Fig. 1 to expel or discharge fluid from the cylinders 52. Such movement of the pistons is termed herein the discharge stroke.

When the cam ring 64 assumes a position perpendicular to the axis of the shaft 26, or in other words its vertical position, no displacement of the pistons 52 laterally will take place.

When the cam ring 64 is inclined in the general direction indicated in Fig. 11, it is obvious that far side pistons as seen in Fig. 1 will perform their intake strokes while the near side pistons will perform their discharge strokes. It is also obvious that the extent of inclination of the cam ring 64 in either direction will determine the amplitude of displacement of the pistons 52 both as regards their suction or intake and their discharge strokes.

Figure 4:
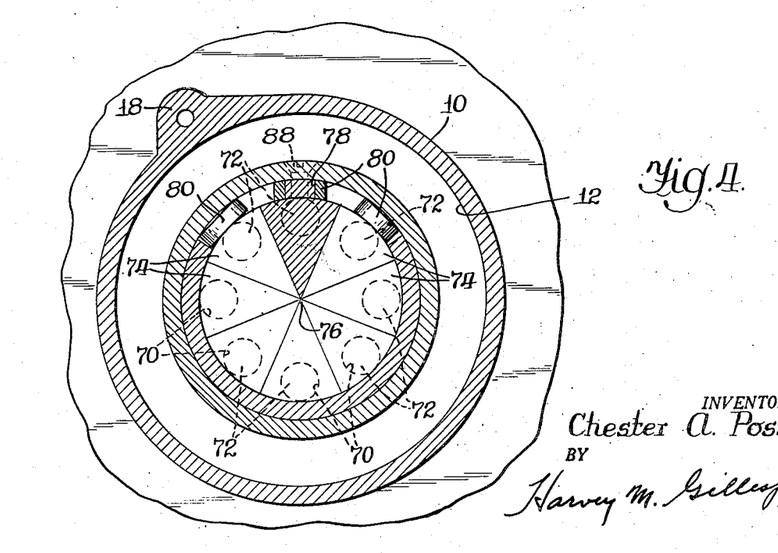
Fig. 4 is a sectional view taken substantially along the line 4—4 of Fig. 1.
Figure 5:
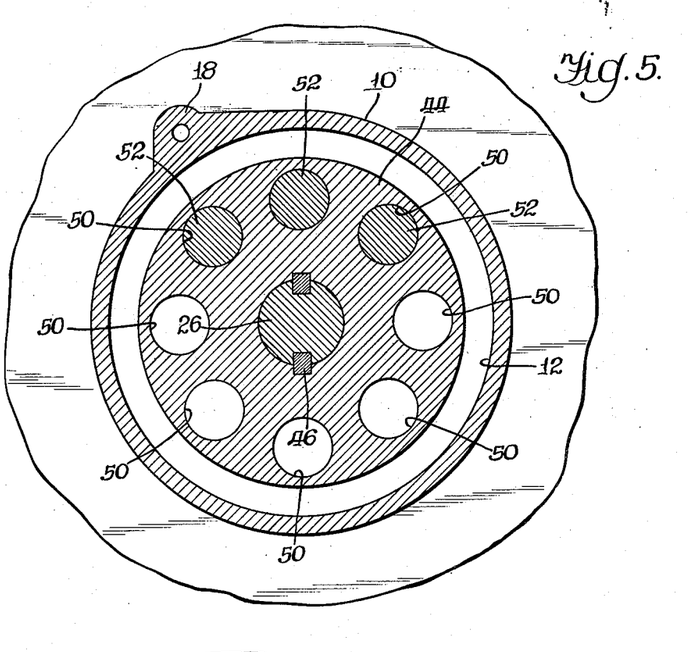
Fig. 5 is a sectional view taken substantially along the line 5—5 of Fig. 1.

Referring now to the motor section 40 as viewed in Fig. 1, the overall diameter of the cylinder block 42 is somewhat smaller than the overall diameter of the cylinder block 44. The block 42 is formed with a series of cylinders or bores 70 therein which are equal in number to the number of cylinders 50 provided in the block 44. The cylinders 70 are circumferentially spaced and radially offset from the axis of rotation of the block 42. The cylinders 70 extend in parallelism and are parallel to the axis of the block 42. The cylinders 70 are of smaller diameter and displacement than the diameter of the cylinders 50 for a purpose that will appear presently, and each cylinder has mounted for reciprocation therein a piston 72. Each piston 72 is provided with a sector shaped head 74 and the inner ends of the various heads terminate along a central axis 76 (Fig. 4). The outer ends of the heads 74 are provided with pins 78 carrying cam rollers 80 which are adapted to ride in an elliptical cam groove or channel 82 provided by virtue of a pair of elliptical guide strips 84 and 86 suitably secured, as for example by means of screws 88 to the inner wall of a sleeve member 90. The sleeve member 90 surrounds the cylinder block 42 and is flanged at one end as at 92 to facilitate connection thereof to a closure plate or disk 94 by means of nut and bolt assemblies 96. The disk 94 is provided with a hub 98 which is mounted on the driven shaft 34 and which provides the inner race of the ball bearing assembly 35.

The arrangement of parts just described in connection with the section 40 of the transmission constitutes, in effect, a motor in which the pistons 72, hydraulically driven from the pistons 52 of the section 38, constitute driving members for imparting rotary motion to the sleeve 90 and consequently to the driven shaft 34 through the medium of the cam groove or channel 82 and the cam rollers 80. Since the driven shaft 34 is adapted to be connected to a load, which in the case of an automotive vehicle is the traction of the vehicle driving wheels upon the road surface, the pistons 72 cannot accurately be said to perform either a discharge stroke or an intake stroke. Rather these pistons 72 follow the movements of the pistons 52 through the medium of the hydraulic fluid and reciprocate in their respective cylinders 70 in timed relation, but not necessarily in unison, with the pistons 52. For purposes of description, however, the pistons 72 may be said to perform a discharge stroke when they move to the right as viewed in Fig. 1 and to perform a suction or intake stroke when they move to the left. Since the pistons 72 are reciprocable within respective cylinders 70 carried in the cylinder block 42 which rotates in unison with the driving shaft 26, movement of the pistons 72 is a function of pressure developed within the cylinders 70 whether this pressure be one of compression or one of suction.

Figure 3:
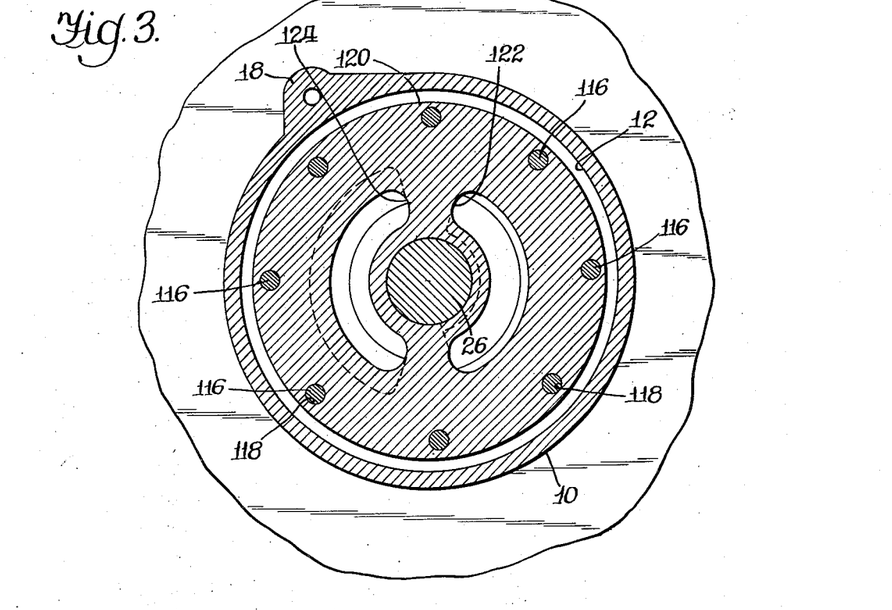
Fig. 3 is a sectional view taken substantially along the line 3—3 of Fig. 1.
Figure 6:
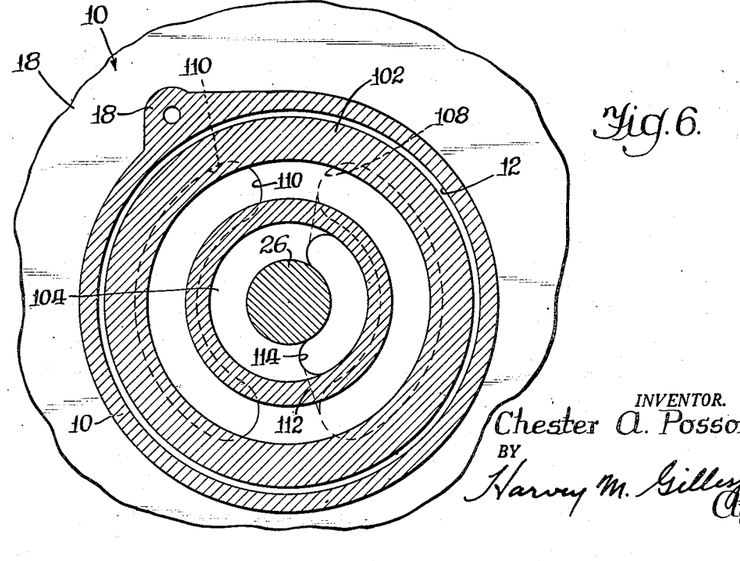
Fig. 6 is a sectional view taken substantially along the line 6—6 of Fig. 1.

Referring now to Figs. 1, 3 and 6, the cylinder blocks 42 and 44 are spaced apart on the shaft 26 and a pair of valve plates 100 and 102 are disposed in side-by-side relationship between the two cylinder blocks.

The valve plate 102 (Figs. 1 and 6) is of circular design, is relatively thick, and is provided with an inner circular well or pressure chamber 104 and a concentric outer circular well or pressure chamber 106. The two circular wells 104 and 106 constitute in effect pressure pockets for delivery of the hydraulic fluid to and from the cylinders 50 and 70 in timed relationship to effect a fluid drive between the pistons 52 and 72 and, under certain circumstances that will be explained subsequently, torque conversion between the driving and driven shafts 26 and 34 respectively.

The valve plate 102 is also formed with a pair of arcuate valve ports 108 and 110, the former communicating with the well 104 and the latter communicating with the well 106. At the rear face of the plate 102, as seen in Fig. 6, the arcuate port openings are concentric and equally displaced from the transverse axis of the plate 102 as well as being of equal width. The port 108 is formed with inclined or sloping end walls 112 and the side walls of the port "slant inwardly" so to speak and communicate with the well 104 through an arcuate port opening 114 of reduced size. The valve plate 102 is non-rotatable, it being suitably secured as at 115 at its peripheral regions to the inner face of the casing 10. The valve ports 108 and 110 are substantially concentric with the path of movement of the ends of the cylinders 50 in the cylinder block 44 and the rear face of the valve plate 102, as seen in Fig. 6, is adapted to fit flush against the left-hand end of the cylinder block 44, as seen in Fig. 1, so as to be in fluid-sealing engagement therewith.

The valve plate 100 (Figs. 1 and 3) is capable of rotation and derives its rotary motion from the sleeve member 90, the rotation of which is controlled by the reciprocal motion of the pistons 72 operating through the cam rollers 80 and cam groove or channel 82. Accordingly, a series of circularly arranged pins 116 project laterally from the left-hand face of the valve plate 100, as viewed in Fig. 1, and extend into openings 118 provided in a circular flange 120 formed on the right-hand end of the sleeve 90. The valve plate 100 may thus be said to be floatingly carried at one end of the sleeve 90 in order that the same may adjust itself in face-to-face relationship with the valve plate 102 to insure proper valve port registry between the various valve ports provided in the two valve plates.

The valve plate 100 is formed with a pair of arcuate valve ports 122 and 124 (Fig. 3), the former communicating with the inner well or pressure chamber 104 and the latter communicating with the outer well or pressure chamber 106. The port openings of the two valve ports 122 and 124 at the left-hand side of the plate 100, as seen in Fig. 1, are of arcuate design and are substantially concentric with the circular path of movement of the ends of the cylinders 70 formed in the cylinder block 42 so that as the sleeve member 90 moves relative to the cylinder block 42, the various cylinders 70 will successively sweep past the ports 122 and 124 and establish communication therewith in passing.

It has previously been stated that the cylinders 70 are of smaller diameter and displacement than the diameter and displacement of the cylinders 50. Specifically, in the form of the invention illustrated herein, the displacement of the cylinders 70 is approximately one-half the displacement of the cylinders 50 in order that for a particular setting of the cam ring 64, an "overdrive" condition, wherein the driven shaft 34 may be driven at twice the speed of the driving shaft 26, may obtain as will presently become clear as the operation of the transmission is set forth.

It has also previously been set forth that the angular position of the cam ring 64 may be varied by manual means, utilizing the lever 69 of Fig. 2 or utilizing the novel control system of the present invention yet to be described. In either event, if it is assumed that the cam ring 64 is adjusted so as to assume the inclination indicated at N in Fig. 8 which represents a "neutral" condition of the transmission, the stroke of the various pistons 52 is of sufficient magnitude as to effect a displacement of fluid substantially equal to the displacement of the pistons 72 when the latter perform their maximum length stroke in the cylinders 70. In other words, as each of the cylinder bores 50 moves into register with the port 110 in the valve plate 102, its respective piston 52 commences its discharge stroke and forces fluid through the port 110 and into the outer well 106. Similarly as each of the cylinder bores 50 moves into register with the port 108, its respective piston commences its intake stroke and withdraws fluid through the port 108 from the inner well 104. At the same time, the two ports 122 and 124 in the rotatable valve plate 100 always assume positions which serve to isolate the pressure of fluid in the two wells 104 and 106 from each other and, as a consequence, fluid is distributed to the various cylinders 70 in timed relation so that the same is forced into such cylinders 70 as are in communication with the well 106 and fluid is withdrawn from such cylinders 70 as are in communication with the inner well 104. The net result of this phenomenon of fluid displacement is to drive the pistons 72 alternately under the influence of pressure and suction and cause them to reciprocate within the cylinders 70 to the fullest extent of which they are capable. This full stroke of the pistons 72 is sufficient to permit the cam rollers 80 to clear the ends of the elliptical cam channel 82 without exerting any driving influence whatsoever upon the sleeve member 90 and, as a consequence, the sleeve remains stationary and the driven shaft 34 receives no application of torque from the driving shaft 26.

The above condition holds true regardless of the speed at which the driving shaft 26 may be rotated or regardless of its direction of rotation. In the case of an automotive transmission, the driving shaft 26 will ordinarily be rotated only in one direction but if the transmission is employed for other uses, as for example in connection with machine tools, the driving shaft 26 may be rotated in a reverse direction under certain circumstances.

Where automotive transmissions are concerned, the application of a load to the driven shaft 34 or the lessening of the load thereon will not be reflected back into the transmission inasmuch as the cam surfaces of the cam members 84 and 86 are free to ride in either direction on the cam rollers 80 without hindrance.

In Fig. 8 wherein the above described neutral condition of the transmission is schematically illustrated, only the application of fluid under pressure from the pistons 52 to the pistons 72 through the well 106 has been portrayed. It is obvious that a similar transmission of motion between the pistons will take place under the influence of fluid at subatmospheric pressures or suction, utilizing the inner well 104. The schematic illustrations of Figs. 9 and 10 are similarly incomplete while the illustration of Fig. 11 showing the reverse condition of the transmission discloses the phenomenon of subatmospheric pressure or suction acting through the inner well 104.

Figure 9:
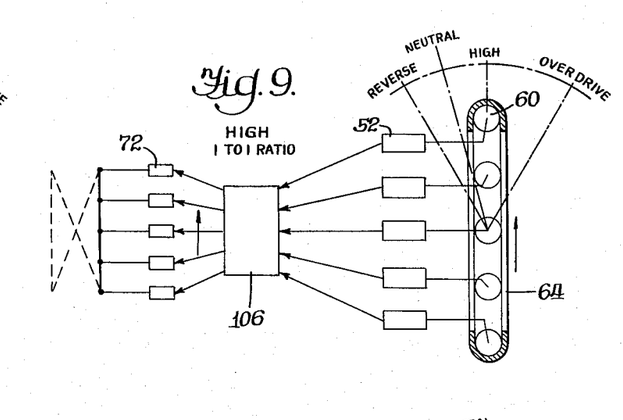
Figures 10, 11:
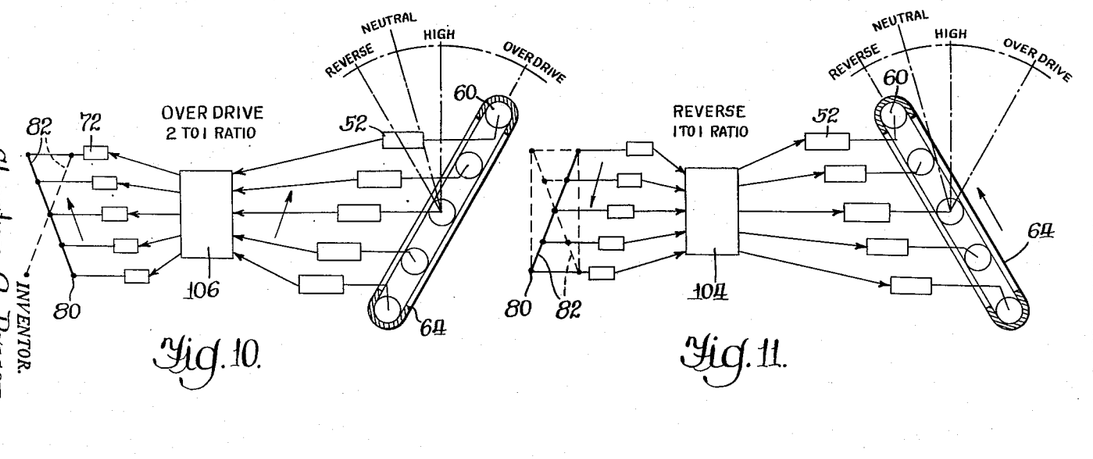

When the cam ring 64 is adjusted so as to assume the position shown in Fig. 9 wherein its plane is perpendicular to the axis of the driving shaft 26, a one-to-one drive ratio exists through the transmission. In such an instance the cam followers 80 have no lateral component of motion and, as a consequence, the pistons 52 make no displacement of fluid. The pistons 72 likewise are not displaced inasmuch as the cylinders 70 receive no fluid from and deliver no fluid to either of the wells 104 or 106. As these pistons 72 revolve about the axis of the cylinder block 42, with no lateral component of displacement, the cam members 84 and 86, which cooperate to make up the cam channel 82, are drawn by the cam rollers 80 in such a manner as to cause the sleeve member 90 to rotate in unison with the cylinder block 42. It is to be noted that in this condition of the transmission there is no relative motion between the various parts of either the pump section 38 or of the motor section 40. All of the working parts thereof rotate in unison without friction and consequently with no wear.

When the cam ring 64 is adjusted so as to assume the position shown in Fig. 10, an overdrive condition exists through the transmission. This overdrive condition represents a two-to-one drive ratio between the driven shaft 34 and the drive shaft 26. As previously stated, the displacement of the cylinders 50 is equal to substantially twice the displacement of the cylinders 70. Thus with the cam ring 64 set in the overdrive position of Fig. 10 the various pistons 52 will effect full displacement of fluid to and from the cylinders 50. However the cylinders 70 are capable of receiving only one-half this amount of fluid before the pistons 72 therein are moved to the limit of their stroke wherein their tendency, in the absence of any increased speed on the part of the driven shaft, would be to commence their discharge stroke. Inasmuch as the pistons 72 are unable at this particular moment to discharge fluid into the particular well which is supplying the cylinders 70 with additional fluid, the sleeve member 90 is obliged to overrun the cylinder block 42 and allow the cylinders 70 to discharge into the particular well which is under sub-atmospheric pressure or suction.

In Fig. 11 the transmission is shown as being in condition for reverse drive. The cam ring 64 is inclined in a counterclockwise direction about its axis of tilting movement to the fullest extent of which it is capable. In such an instance the pistons 52 are displacing the full capacity of the cylinders 50 from the inner well 104 while the pistons 72 are capable of displacing only one-half this amount of fluid from the cylinders 72. The net result is that the sleeve member 90 is obliged to follow the movements of the various cam rollers 80 and rotate in a reverse direction to an extent proportionate to the amount of excess fluid withdrawn from the well 104.

A similar relationship exists in connection with the outer well 106 which receives from the cylinders 50 a full quota of displaced fluid but is capable of delivering only one-half this amount of fluid to the cylinders 70.

I claim:

1. In a variable speed fluid drive transmission, a driving shaft and a driven shaft, a cylinder block mounted on said driving shaft for rotation in unison therewith and having a horizontal cylinder formed therein, a piston slidably disposed within said cylinder, a non-rotatable circular cam ring surrounding said driving shaft and providing a circular cam path, one end of said piston projecting axially beyond the confines of said cylindler and having a cam follower constrained to follow said cam path, means for adjusting the angular position of said cam ring and consequently of the cam path to vary the amplitude of displacement of said piston in said cylinder, a second cylinder block mounted on said driving shaft for rotation in unison therewith and having a horizontal cylinder formed therein, a sleeve member surrounding said latter cylinder block and projecting axially beyond one end thereof, a piston slidably disposed within said latter cylinder and having an end thereof projecting beyond the confines of the latter, means defining an elliptical cam path in the axially projecting portion of said sleeve member, a cam follower on said latter piston constrained to follow said elliptical cam path, means operatively connecting said sleeve member and driven shaft in driving relationship, and valve means disposed between said cylinder blocks establishing fluid communication between said cylinders.

2. In a variable speed fluid drive transmission including a driving member and a driven member, a pair of spaced cylinder blocks of cylindrical configuration mounted on said driving member for rotation in unison therewith and each having a series of circumferentially spaced horizontal cylinders formed therein arranged in parallelism, a piston slidably disposed in each cylinder, non-rotatable circular cam means operatively engaging the pistons of one cylinder block for imparting reciprocal movements thereto during rotary movement of the driving member, cam means operatively connecting the pistons of the other cylinder block to the driven member whereby reciprocal movement of the former will impart rotary movement to the latter, and valve means disposed between said cylinder blocks transversely of said cylinders and establishing fluid communication between said series of cylinders.

3. In a variable speed fluid drive transmission, a driving shaft, a driven shaft, first and second cylinder blocks of cylindrical configuration mounted on said driving shaft in spaced relationship for rotation in unison therewith, there being a series of horizontal cylinders formed in each block, the cylinders in one block being of less diameter than in the other, a piston mounted for reciprocation in each cylinder, cam means engaging the series of pistons in one block for translating rotary motion of the driving shaft into reciprocal movements of the pistons, cam means for translating the reciprocal movements of the pistons in the other series of cylinders into rotary movement of the driven shaft, and valve means disposed transversely of said cylinders between said cylinder blocks for directing fluid displaced from one series of cylinders into the other series of cylinders to effect reciprocation of the pistons in said latter series upon reciprocation of the pistons in said former series.

4. In a variable speed fluid drive transmission, a driving shaft, a driven shaft, first and second cylinder blocks of cylindrical configuration mounted on said driving shaft in spaced relationship for rotation in unison therewith, there being a series of cylinders formed in each block, a piston mounted for reciprocation in each cylinder and formed at its outer end with a head portion having opposite side faces constituting thrust surfaces, each of which slidably engages a side face of an adjacent piston head portion, cam means engaging the series of piston heads associated with the pistons in one block for translating rotary motion of the driving shaft into reciprocal movements of the pistons whose head portions are engaged by said cam means, cam means engaging the head portions of the pistons in the other series of cylinders for translating reciprocating movements thereof into rotary movement of the driven shaft, valve means including a stationary disk and a rotatable disk cooperating therewith to provide a pressure well between said cylinder blocks, means for directing fluid displaced from one series of cylinders into said pressure well, and means for directing such displaced fluid from said pressure well to the other series of cylinders for causing reciprocation of the pistons in said latter series.

5. A variable speed fluid drive transmission as defined in claim 4 characterized in that the head of each piston includes a sector shaped portion which extends toward the rotational axis of the cylinder block with which its piston is associated.

6. A variable speed fluid drive transmission as defined in claim 5 in which the sector shaped piston heads associated with the first cylinder block bear slidably on the driving shaft.

7. In a variable speed fluid drive transmission, a driving shaft, a driven shaft, first and second cylinder blocks of cylindrical configuration mounted on said driving shaft in spaced relationship for rotation in unison therewith, there being a series of horizontal open end cylinders formed in each block, a piston mounted for reciprocation in each cylinder, cam means for translating rotary motion of the driving shaft into reciprocal movements of the pistons of the first cylinder block, cam means for translating the reciprocal movements of the pistons of the second cylinder block into rotary movement of the driven shaft, said pistons, upon reciprocation thereof, performing alternate discharge and intake strokes within their respective cylinders to discharge fluid from, and to draw fluid into, their respective cylinders, means traversing the open ends of said cylinders providing two pressure wells between said cylinder blocks, means for directing fluid discharged from the cylinders of said first block into one of said wells, valve means for directing fluid discharged into said latter well to the cylinders of the second block during the intake strokes of their respective pistons, said valve means also serving to direct fluid discharged from the cylinders of said second block into the other well, and means for directing fluid so discharged into said latter well to the cylinders of the first block during the intake strokes of their respective pistons.

8. In a variable speed fluid drive transmission, a driving shaft, a driven shaft, first and second cylinder blocks of cylindrical configuration mounted on said driving shaft in spaced relationship for rotation in unison therewith, there being a series of horizontal open end cylinders formed in each block, a piston mounted for reciprocation in each cylinder, cam means for translating rotary motion of the driving shaft into reciprocal movements of the pistons of the first cylinder block, cam means for translating the reciprocal movements of the pistons of the second cylinder block into rotary movement of the driven shaft, said pistons, upon reciprocation thereof, performing alternate discharge and intake strokes within their respective cylinders to discharge fluid from and draw fluid into the same respectively, valve means traversing the open ends of said cylinders and providing two pressure wells between the cylinder blocks and operable during the discharge strokes of the pistons in the cylinders of the first block for directing the discharged fluid into one of said pressure wells and operable during the intake strokes of said latter pistons for directing fluid from the other well to the cylinders for intake purposes, said valve means also being operable during the intake stroke of the pistons of the second block to direct fluid from the first specified well to the cylinders of said latter block for intake purposes and operable during the discharge strokes of said latter pistons to direct the discharged fluid to said second specified well.

9. In a variable speed fluid drive transmission, a driving shaft, a driven shaft, first and second cylinder blocks mounted on said driving shaft in spaced relationship for rotation in unison therewith, there being a series of cylinders formed in each block, a piston mounted for reciprocation in each cylinder, cam means for translating rotary motion of the driving shaft into reciprocal movements of the pistons of the first cylinder block, cam means for translating reciprocal movements of the pistons of the second cylinder block into rotary movement of the driven shaft, said pistons, upon reciprocation thereof, performing alternate discharge and intake strokes within their respective cylinders to discharge fluid from and draw fluid into the same respectively, valve means including a fixed element and a rotatable element extending transversely of the cylinders and cooperatively engaged to provide two pressure wells between said cylinder blocks, said rotatable valve element being positioned whereby the cylinders of the first block discharge fluid to one of said wells while simultaneously drawing fluid from the other well, and the cylinders of the second block discharge fluid to said second specified well while simultaneously drawing fluid from said first well.

10. In a variable speed fluid drive transmission, a driving shaft, a driven shaft, a cylinder block mounted on said driving shaft for rotation in unison therewith and having a cylinder formed therein, a piston slidably disposed within said cylinder, a non-rotatable circular cam ring surrounding said driving shaft and providing a circular cam path, one end of said piston projecting axially beyond the confines of said cylinder and having a cam follower constrained to follow the confines of said cam path, means for adjusting the angular position of said cam ring and consequently of the cam path to vary the amplitude of displacement of said piston in said cylinder, a second cylinder block mounted on said driving shaft for rotation in unison therewith and having a cylinder formed therein, a piston slidably disposed in said latter cylinder, the diameter of said latter cylinder being smaller than the diameter of the former cylinder whereby the volumetric displacement thereof is less than the volumetric displacement of the former cylinder, a sleeve member surrounding said latter cylinder block and rotatable thereon, said sleeve member projecting axially beyond one end of said latter block, means defining an elliptical cam path in the axially projecting portion of said sleeve member, a cam follower on said latter piston constrained to follow said elliptical cam path, means operatively connecting said sleeve member and driven shaft in driving relationship, and valve means disposed between said cylinder blocks establishing fluid communication between said cylinders.

References Cited in the file of this patent

UNITED STATES PATENTS

| Number | Name | Date |
|---|---|---|
| 2,186,556 | Robbins | Jan. 9, 1940 |
| 2,460,949 | Schmied | Feb. 8, 1949 |
| 2,571,561 | Genety | Oct. 16, 1951 |

FOREIGN PATENTS

| Number | Country | Date |
|---|---|---|
| 508,434 | France | July 24, 1920 |